Figure 1:
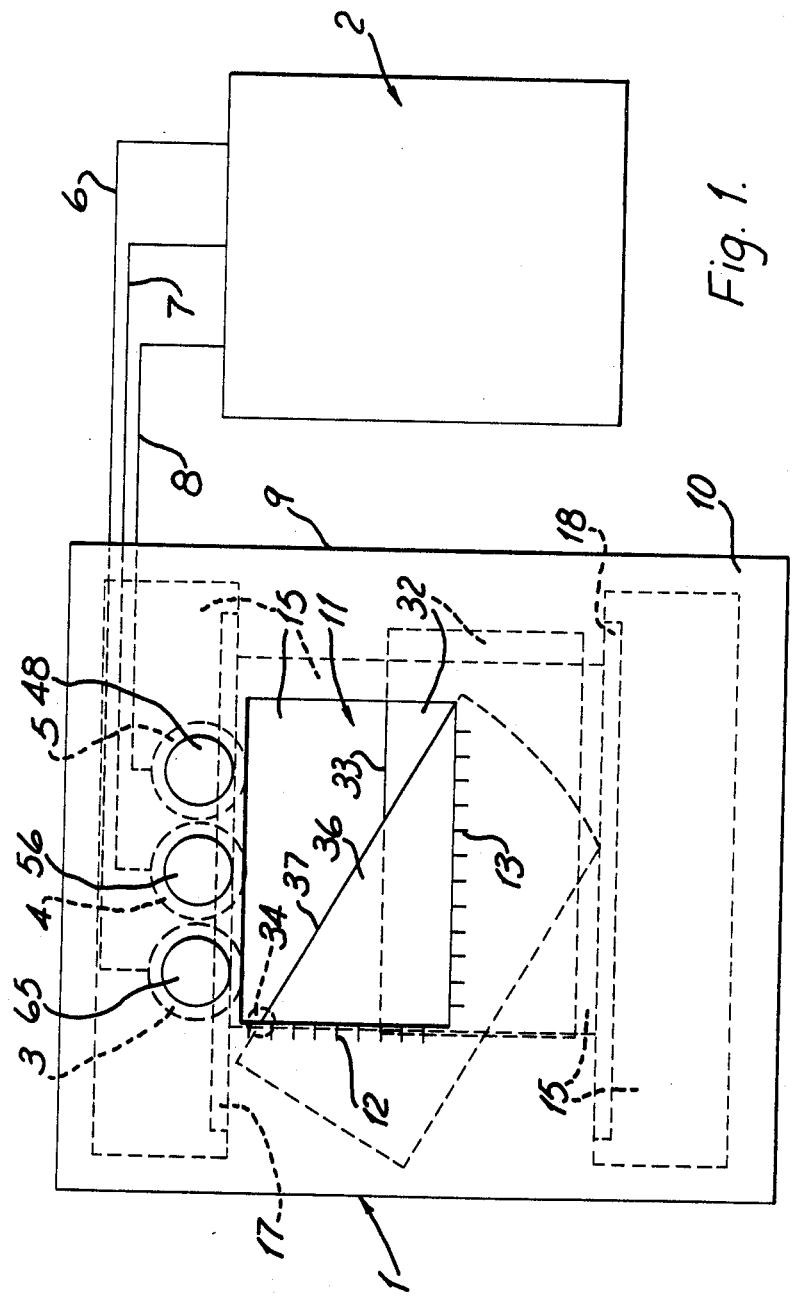

United States Patent [19]

Bennett et al.

[11] 4,110,836

[45] Aug. 29, 1978

[54] PROGRAM CONTROL AND DISPLAY APPARATUS

[75] Inventors: John Peter Bennett, Banstead; Graham Robin Scott Jones, Bristol, both of England

[73] Assignee: Masson Scott Thrissell Engineering Ltd., London, England

[21] Appl. No.: 767,702

[22] Filed: Feb. 10, 1977

[30] Foreign Application Priority Data

Feb. 19, 1976 [GB] United Kingdom ............... 06689/76

[51] Int. Cl.$^2$ ............................................. G06G 7/16
[52] U.S. Cl. .................................. 364/860; 235/61 R; 346/33 R
[58] Field of Search ............... 235/197, 198, 193, 184, 235/151, 151.1, 61.6 A, 61.6 B, 61 R, 61 A, 61 PM; 346/33 R; 318/567, 568

[56] References Cited

U.S. PATENT DOCUMENTS

| | | | |
|---|---|---|---|
| 3,311,742 | 3/1967 | Anderson | 235/197 |
| 3,402,286 | 9/1968 | Mather | 235/197 X |
| 3,441,922 | 4/1969 | Thompson | 235/197 X |
| 3,689,756 | 9/1972 | Haigh | 235/197 |
| 3,752,973 | 8/1973 | Thorn et al. | 235/197 |

Primary Examiner—Joseph F. Ruggiero
Attorney, Agent, or Firm—Seidel, Gonda and Goldhammer

[57] ABSTRACT

A number of values of a variable defining a program of operations are settable by means of three potentiometers, connected to a controlled apparatus, which control respectively the initial, final, and rate of change of the variable, each potentiometer having an associated plate one edge of which indicates the value set against a scale. The plate edges form a curve of a graph indicative of the program. In a modification a plurality of linear potentiometers are located at different positions along a scale showing stages in the program, the sliders of the potentiometers being used to set and also indicate the value of the variable at each stage.

5 Claims, 5 Drawing Figures

PROGRAM CONTROL AND DISPLAY APPARATUS

This invention concerns improvements in or relating to program control and display apparatus having a plurality of values of a variable which may be set so as to define a program of operations.

In such apparatus it is often the case that the operator, once he has set up the program of operations in the control device, has no check on each of the values of the variable he has set and no indication of the overall program that the apparatus is to follow.

According to the present invention there is provided a program control and display apparatus for setting a plurality of values of a variable defining a program of operation for a controlled apparatus, comprising a setting device for each value of said variable and a display device adapted to display a graphic representation of said program, each setting device including means for connection to the controlled apparatus so as to govern the respective value of said variable and means connected to said display device so as to produce a corresponding indication in said graphic representation.

Preferably each of said setting devices comprises a variable potentiometer and in one form of apparatus according to the invention said control and display apparatus includes a first potentiometer for setting said variable to a first predetermined value, at one stage in said program, a second potentiometer for setting said variable to a second predetermined value, at a further stage in said program, and a third potentiometer for setting the rate at which said variable changes from said first to said second value.

The said display device may include reference means provided with datum marks defining the axes and scales of said graphic representation of the values of said variable during said program. The display device may further include indicator means comprising first and second plates, wherein said first plate is pivotally connected to first carrier means, said second plate is fixed to second carrier means, both said carrier means being mounted on separate guide means for movement relative to said reference means so that said plates provide a visual display of a curve indicative of the program determined by said setting devices.

Conveniently the control and display apparatus further includes means for moving said first carrier means to a position such that one edge of said first plate is opposite the datum mark on one of said scales indicative of said first predetermined value of said variable, means for moving said second carrier means to a position such that one edge of said second plate is opposite the datum mark on said one of said scales indicative of said second predetermined value of said variable, and means for pivoting said first plate about said pivotal connection on said first carrier means to a position such that said one edge of said first plate intercepts said one edge of said second plate at a position opposite the datum mark on said other scale indicative of the stage in said program at which the value of said variable is required to equal said second predetermined value.

The apparatus of the present invention is suitable for use with a variety of forms of apparatus which operates according to preset programs of operations. An example of such an apparatus is described and illustrated in our copending British patent application No. 26923/76.

The invention will now be described, by way of example only, with reference to the accompanying drawings in which:

FIG. 1 is a diagrammatic view of a control and display apparatus according to the invention for setting a defined program of operations in a controlled apparatus.

Figure 2:
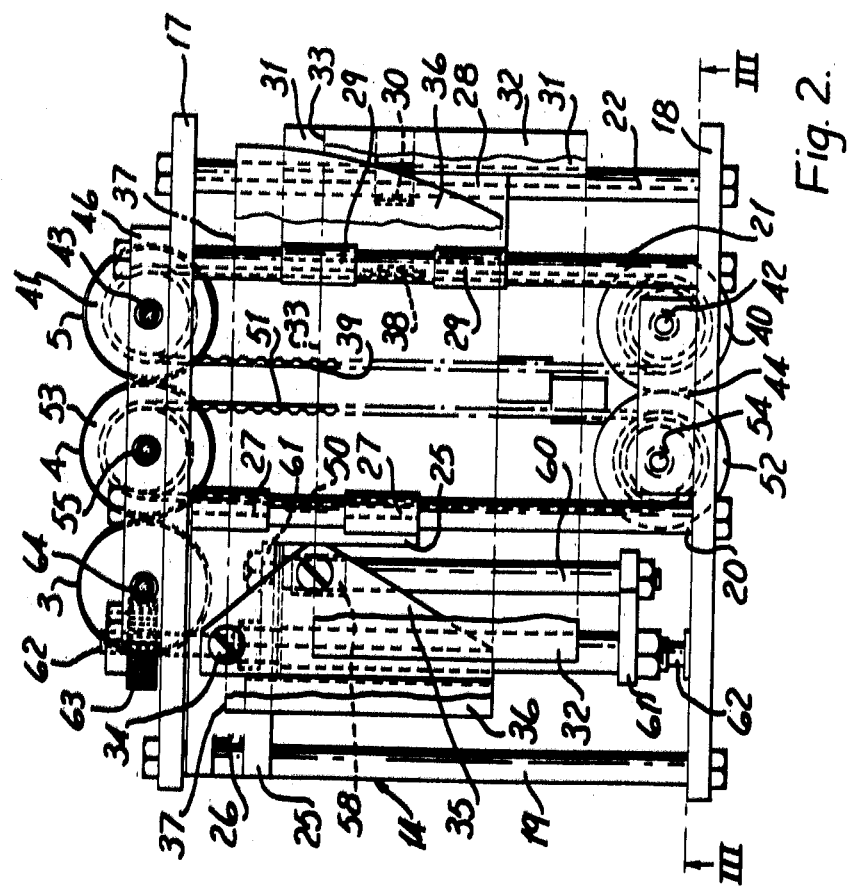
Figure 3:
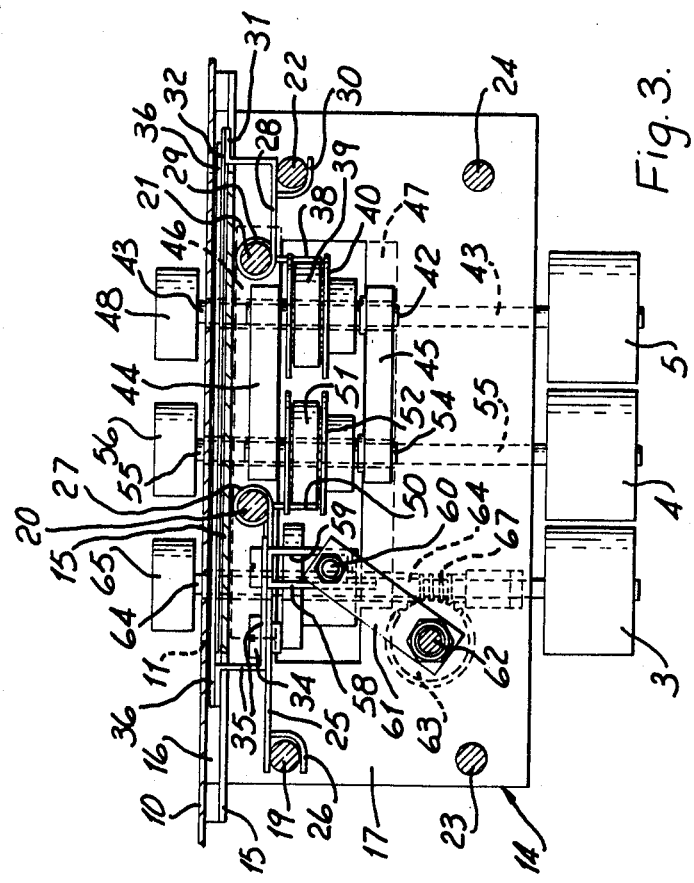
Figure 4:
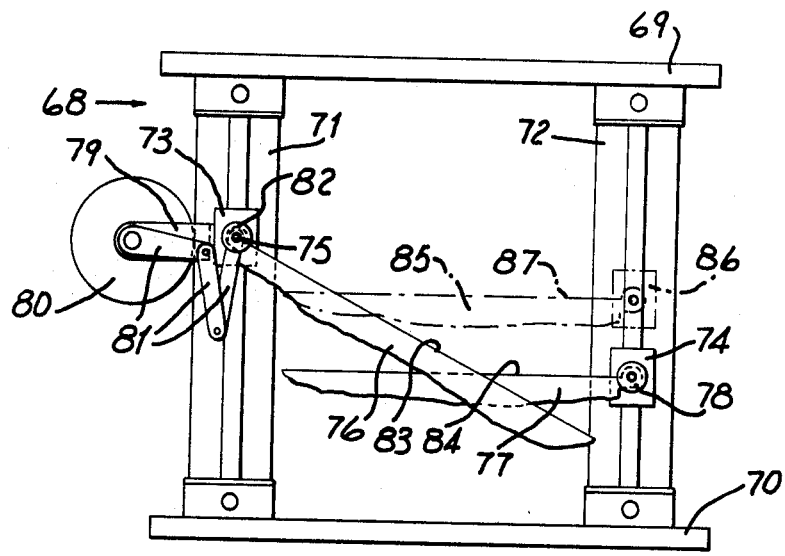
Figure 5:
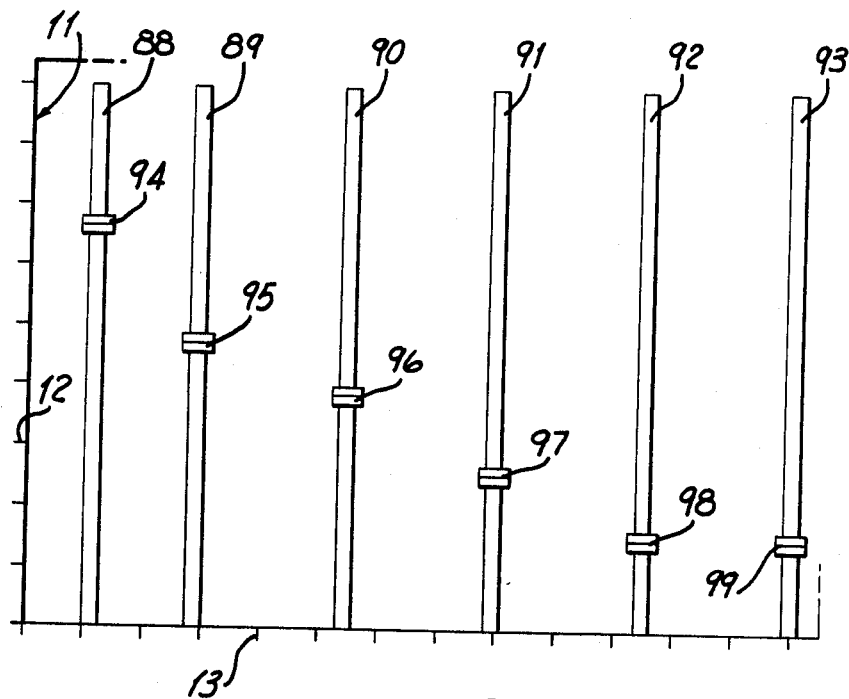

FIG. 2 is a front view of part of the apparatus of FIG. 1 drawn to a larger scale and showing one form of graphical display device, some parts being shown in a different position, FIG. 3 is a section taken on the line III—III of FIG. 2, FIG. 4 is a view similar to FIG. 2 but showing a modified form of apparatus for use in the apparatus of FIG. 1, and FIG. 5 is a diagrammatic view similar to FIG. 4 but showing a further modified form of apparatus for use in the apparatus of FIG. 1, and also a modified form of graphical display device.

Referring to the drawings, 1 is a control and display apparatus and 2 is a controlled apparatus which is adapted to operate according to a defined program of operations consisting of three predetermined values of a variable, the desired values of the variable for any chosen program of operations of the apparatus 2 being settable, as will be described later, by means of the apparatus 1. As the program that the apparatus 2 follows may need to be varied from time to time, the three values of the variable are set by means of rotary variable potentiometers 3, 4 and 5, from each of which an electrical signal is produced, each signal being a function of one of the three desired values, the potentiometers 3, 4, 5 being connected respectively, by wires 6, 7 and 8 to the apparatus 2. The apparatus 2 forms no part of the present invention so will not be further described here.

The apparatus 1 comprises a box having a front panel 10 in which an opening 11 is provided, which may be covered by a sheet of any convenient type of transparent material (not shown). The left hand and bottom (as viewed in FIG. 1) edges of the opening 11 are respectively provided with datum marks 12, 13 and represent the ordinates and abscissae of a graph, as will be explained later. Mounted inside the box 9, on the front panel 10 is a unit 14 comprising a cover plate 15 (FIGS. 1 and 3) which is so mounted that a narrow space 16 is provided between the plate 15 and the front panel 10 as can be seen in FIG. 3, and top and bottom plates 17, 18 respectively which extend into the box 9 at right angles to the plate 15. The plate 15 is positioned so that it lies behind the opening 11. For the sake of clarity the cover plate 15 has been omitted from FIG. 2.

Four parallel guide rods 19, 20, 21 and 22 extend between the top and bottom plates 17, 18, each of the rods being fixed at opposite ends thereof, to the plates 17, 18 respectively.

Slidably supported on the guide rods 19, 20 is a carrier plate 25 which, for this purpose, is provided with extensions 26, 27 which are respectively bent round the guide rods 19, 20, the plate 25 having a further extension 50 bent into the form of an angle bracket, as shown in FIG. 3. A further carrier plate 28 is slidably supported on the guide rods 21, 22 by means of extensions 29, 30 which are respectively bent round guide rods 21, 22, the plate 28 also having a further extension 31 bent into the form of an angle bracket, as shown in FIG. 3.

Pivotably connected at 34 to the carrier plate 25 is a bracket 35. A first indicator plate 36 is fixed at one end to the bracket 35 so that it lies in the narrow space 16, parallel to the cover plate 15, between the latter and the front panel 10, the indicator plate 36 extending across and being visible through, the opening 11 in the front panel 10. One edge 37 of the plate 36 forms part of a curve of a graph, as will be described later which gives a graphical representation of the program that the apparatus 2 is to follow.

A second indicator plate 32 is fixed at one end to the further extension 31 of the plate 28, so that it also lies in the narrow space 16, parallel to the indicator plate 36, between the latter and the cover plate 15, the indicator plate 32 also extending across and being visible through, the opening 11. One edge 33 of the plate 32 forms another part of the curve of the graph mentioned above with respect to the edge 37 of the indicator plate 36, the edge 33 being arranged parallel to the edge of the opening 11 having the datum marks 13.

To enable the plate 28 to be moved along the guide rods 21, 22, as mentioned above, the plate 28 is provided with a projection 38 which is fixed to an endless drive belt 39 be rivets (not shown). The belt 39 extends between pulleys 40, 41 which are respectively fixed to shafts 42, 43, the shaft 42 being journalled at its ends in two blocks 44, 45 fixed to the bottom plate 18 and the shaft 43 passing through and being journalled in two blocks 46, 47 fixed to the top plate 17. One end of the shaft 43 extends through the cover plate 15 and front panel 10, and has a control knob 48 fixed to it, and the other end carries the rotary variable potentiometer 5.

Similarly, the extension 50 of the plate 25 is fixed to a further endless drive belt 51 which extends between pulleys 52, 53 fixed respectively to shafts 54, 55 journalled in the blocks 44, 45 and 46, 47, the shaft 55 having, at opposite ends respectively, a control knob 56 and the rotary variable potentiometer 4 fixed thereto. The arrangement is such that by turning the control knobs 48, 56 the plates 28, 25 and thus the first and second indicator plates 36, 32 respectively may be moved separately to any predetermined position (so that the edges 37, 33 are positioned opposite any of the datum marks 12) between the top and bottom plates 17, 18.

Pivotally connected to the underside of the bracket 35 is a member 58 which is formed so as to provide a slot 59 through which passes a rod 60. Each end of the rod 60 is fixed to one end of one of a pair of arms 61, the other ends of which are fixed to a shaft 62 which is journalled in both of the plates 17, 18. The shaft 62 extends beyond the plate 17 and has a wormwheel 63 fixed to it, as shown in FIGS. 2, 3. A shaft 64 passes through, and is journalled in, the blocks 46, 47 and has, at opposite ends respectively, a control knob 65 and the rotary variable potentiometer 3 fixed thereto. Part of the shaft 64 is formed as a worm 67 (FIG. 3) which is arranged to mesh with the wormwheel 63. The arms 61 are spaced apart by a distance such that the member 58 is free to move along the rod 60 in unison with the movement of the indicator plate 36 along the guide rods 19, 20 as described above.

As stated previously, the indicator plate 36 is pivotably mounted on the bracket 35, the pivotal movement being obtained by turning the control knob 65 which causes, via the worm 67 and wormwheel 63, the shaft 62 to rotate. This causes the arms 61 and rod 60 to move about the axis of the shaft 62; the rod 60, in turn acting on the member 58 to move the bracket 35 and thus the indicator plate 36 about the axis of the pivotal connection 34, the member 58 moving along the rod 60 and the rod 60 moving along the slot 59 during this movement. Due to the fact that the plate 36 is so positioned on the bracket 35 that the edge 37 passes over the axis of the pivotal connection 34, pivotal movement of the plate 36, described above, has no effect on the position of the plate as set by turning the control knob 56, even though it does alter the orientation of the plate 36.

The operation of the apparatus described above in setting up a program which the apparatus 2 is to follow will now be described. For convenience it will be assumed that the variable, for which the three values previously mentioned are set, is the pressure of, for example, air, required to be applied to a movable part of the apparatus 2. In this case the datum marks 12 represent the pressure of the air and the datum marks 13 represent time (i.e. successive stages in the program to be set up), and the values to be set are an initial air pressure, a final air pressure, and the rate at which it is required that the air pressure changes from the initial to the final pressure. In the starting position the indicator plate 36 is rotated so that the edge 37 is parallel to the edge 33 of the plate 32.

To set the desired value of the initial air pressure the machine operator turns the control knob 56 so as to move the first indicator 36, as described above, until the edge 37 is opposite the appropriate datum mark 12. This movement of the control knob 56 causes shaft 55 to rotate and thus set potentiometer 4 to such a position that the output electrical signal obtained therefrom is a function of the initial air pressure desired. To set the desired value of the final air pressure the operator turns control knob 48 so as to move the second indicator plate 32 until the edge 33 is opposite the appropriate datum mark 12. Simultaneously the potentiometer 5 is set to such a position, through rotation of the shaft 43, that the output signal obtained from the potentiometer 5 is a function of the final air pressure desired. To set the rate at which it is desired that the air pressure changes from the initial to the final pressure, the operator turns control knob 65 so that the first indicator plate 36 is rotated, as previously described, until the edge 37 intercepts the edge 33 of the second indicator plate 32 at a position opposite the appropriate datum mark 13 (i.e. the stage in the program at which it is desired that the final pressure is attained). Simultaneously, through rotation of shaft 64, the potentiometer 3 is set to such a position that the output signal obtained therefrom is a function of the desired rate of change of air pressure. The electrical signals obtained from the potentiometers 5, 4 and 3 are fed respectively along the wires 8, 7 and 6 to the apparatus 2 in which any convenient known devices (not shown) are used to convert the signals into a form such that the movable part of the apparatus 2 may be operated to follow the desired program.

It will thus be seen that, through the potentiometers 5, 4 and 3, it is possible to preset the required initial, final and rate of change values of the pressure of the air required to operate the movable part of the apparatus 2, and the edges 37, 33 together form the curve of a graph, as shown in FIG. 1, which presents the operator with a graphical representation of the program he has set.

If it is desired that the pressure of the air should remain constant at the initial value, then the only operation required is to move the first indicator plate 36 so that the edge 37 is opposite the appropriate datum mark 12.

Instead of using rotary potentiometers as described above with reference to FIGS. 1 to 3, FIG. 4 shows a unit 68 which utilises linear variable potentiometers the output signals from which are indicative of the desired initial and final values of the air pressure referred to above. The unit 68 has top and bottom plates 69, 70 respectively which correspond to the top and bottom plates 17, 18, and a cover plate (not shown) which corresponds to the cover plate 15, the unit 68 being mounted inside the box 9 in a similar manner to the unit 14 so that a narrow space, corresponding to the space 16 is provided between the cover plate and the front panel 10 of the box 9. Two linear potentiometers 71, 72 extend between the top and bottom plates 69, 70, each of the potentiometers being fixed at opposite ends thereof to the plates 69, 70 respectively. The slider of potentiometer 71 has a block 73 fixed to it and a block 74 is fixed to the slider of potentiometer 72. Pivotally connected at 75 to the block 73 is an indicator plate 76, which corresponds to the first indicator plate 36, and fixed to the block 74 is an indicator plate 77, which corresponds to the second indicator plate 32, and a control knob 78. Also fixed to the block 73 is a bracket 79 which carries a rotary variable potentiometer 80. The pivotal connection 75 is connected to the input shaft of the potentiometer 80 by means of three links 81 which are pivotally connected together as shown in FIG. 4, and also has a control knob 82 fixed to it.

If desired, a fourth potentiometer (not shown) and a third plate (not shown) could be added to the apparatus shown in FIGS. 1–3. The potentiometer could be mounted in the same way as potentiometer 5 and the third plate, similar to plate 32, could be mounted and moved in a similar manner to the plate 32.

In operation, and using the same assumptions as when describing the operation of the apparatus as described earlier with reference to FIGS. 1, 2 and 3. to set the desired value of the initial air pressure, the operator moves the block 73, and thus the indicator plate 76, by means of the control knob 82 until an edge 83 of the plate 76 is opposite the appropriate datum mark 12, which movement sets the slider of the potentiometer 71 at such a position that the output signal thereof is a function of the initial air pressure desired. Also, the potentiometer 80 is moved in unison with the block 73, but this movement does not cause any alteration in the setting of the potentiometer 80. To set the desired value of the final pressure the operator moves the block 74, and thus indicator plate 77, by control knob 78 until an edge 84 of the plate 77 is opposite the appropriate datum mark 12, which movement sets the slider of the potentiometer 72 so that the output signal thereof is a function of the final air pressure desired. To set the rate of change of the air pressure from the initial to the final pressure, the plate 76 is rotated by turning control knob 82 until the edge 83 intercepts the edge 84 at a position opposite the appropriate mark 13, thus causing, through the links 81, the potentiometer 80 to be set such that the output signal thereof is a function of the desired rate of change of air pressure.

It will be noted that in both forms of apparatus described above the pressure of the air begins to change as soon as the apparatus 2 is started. However, it may be desired to keep the initial pressure constant up to any predetermined stage in the program before it is changed according to the setting of the potentiometer 80. This condition is achieved, as shown in chain-dot lines in FIG. 4, by providing a third indicator plate 85 which is fixed to a block 86 carried on a further slider provided on the potentiometer 72. With the added facility of the third indicator plate 85 the value of the initial pressure is set by moving the plate 85 until its edge 87 is opposite the appropriate datum mark 12, and the values of the final pressure and the rate of change of pressure are set as described above, so that the edge 83 intersects the edge 87 at a point opposite the datum mark 13 which is indicative of that stage in the program at which it is desired the air pressure should start to change, and the edge 84 at a point opposite the datum mark 13 which is indicative of that stage in the program at which it is desired the air pressure should reach the final value.

It will be obvious that with the use of the indicator plate 85 and the further slider on the potentiometer 72, the potentiometer 71 is not necessary, but some form of guide means, such as a rod (not shown) on which the block 73 may slide must be provided. In the apparatus shown in FIG. 4 the curve of the graph of a program is made up by the edges 87, 83 and 84.

With the forms of apparatus so far described it is only possible to set a predetermined air pressure at two stages in the program. However, it may be desirable to be able to set a predetermined air pressure at any number of stages in the program. Such an apparatus is diagrammatically illustrated in FIG. 5. The apparatus comprises six linear variable potentiometers 88 to 93 provided respectively with blocks 94 to 99 carried on the sliders (not shown) associated with the potentiometers 88 to 93, the apparatus being mounted inside the box 9 so that the blocks 94 to 99 are visible through the opening 11. The potentiometers 88 to 93 are located at positions opposite the datum marks 13 which are indicative of the stages in the program at which a predetermined air pressure is required and extend parallel to that edge of the opening 11 provided with the datum marks 12.

In operation, the slider of each of the potentiometers 88 to 93 is moved separately, by means of the blocks 94 to 99 respectively, to a position opposite the appropriate datum mark 12, the blocks 94 to 99 representing points along the curve of the graph to provide the graphical representation of the program.

It should be noted that any desired number of potentiometers may be used with the apparatus shown in FIG. 5 and, in this context, it is possible to set up a program in which the air pressure applied to the movable part of the apparatus 2 is varied (i.e. increased or decreased) any number of times, within the limit of the number of potentiometers provided. Thus it will be possible to set up a program in which the values of the initial and final pressures are the same, but the pressure is changed during the course of the program depending on the respective positions of the sliders on each of the potentiometers.

We claim:

1. A program control and display apparatus for setting a plurality of values of a variable defining a program of operation for a controlled apparatus, comprising a display device adapted to display a graphic representation of said program, three setting devices, each comprising a variable potentiometer for a different one of three values of said variable, and for connection to the controlled apparatus so as to govern the respective value of said variable and means connected to said display device so as to produce a corresponding indication in said graphic representation, said potentiometers including a first potentiometer for setting said variable to a first predetermined value at one stage in said program, a second potentiometer for setting said variable to a second predetermined value at a further stage in said program, and a third potentiometer for setting the rate at which said variable changes from said first to said second value.

2. Apparatus as claimed in claim 1 in which said display device includes reference means provided with datum marks defining the axes and scales of said graphic representation of the values of said variable during said program.

3. Apparatus as claimed in claim 2 in which said display device further includes indicator means comprising, first and second plates, first and second carrier means and guide means, wherein said first plate is pivotally connected to said first carrier means, said second plate is fixed to said second carrier means, both said carrier means being mounted on separate ones of said guide means for movement relative to said reference means so that said plates provide a visual display of a curve indicative of the program determined by said setting devices.

4. Apparatus as claimed in claim 3 further including means for moving said first carrier means to a position such that one edge of said first plate is opposite the datum mark on one of said scales indicative of said first predetermined value of said variable, means for moving said second carrier means to a position such that one edge of said second plate is opposite the datum mark on said one of said scales indicative of said second predetermined value of said variable, and means for pivoting said first plate about said pivotal connection on said first carrier means to a position such that said one edge of said first plate intercepts said one edge of said second plate at a position opposite the datum mark on said other scale indicative of the stage in said program at which said variable is required to attain said second predetermined value.

5. Apparatus as claimed in claim 3 in which said display device further includes a fourth variable potentiometer, third carrier means and a third plate, wherein said third plate is fixed to said third carrier means mounted for movement relative to said reference means so that one edge of said third plate is opposite the datum mark on said one of said scales indicative of said first predetermined value of said variable, means for moving said second carrier means to a position such that said one edge of said second plate is opposite the datum mark on said one of said scales indicative of said second predetermined value of said variable, and means for pivoting said first plate about said pivotal connection on said first carrier means to a position such that said one edge of said first plate intercepts said one edge of said third plate at a position opposite the datum mark on said other scale indicative of the stage in said program at which the value of said variable is required to start to change, and said one edge of said second plate at a position opposite the datum mark on said other scale indicative of the stage in said program at which the value of said variable is required to attain said second predetermined value.

* * * * *